(12) United States Patent
Kawanishi et al.

(10) Patent No.: US 11,048,043 B2
(45) Date of Patent: Jun. 29, 2021

(54) OPTICAL FIBER FUSION-SPLICER AND ELECTRODE ROD UNIT

(71) Applicant: FUJIKURA LTD., Tokyo (JP)

(72) Inventors: Noriyuki Kawanishi, Sakura (JP); Makoto Iwamatsu, Sakura (JP)

(73) Assignee: Fujikura Ltd., Tokyo (JP)

( * ) Notice: Subject to any disclaimer, the term of this patent is extended or adjusted under 35 U.S.C. 154(b) by 405 days.

(21) Appl. No.: 15/999,661

(22) PCT Filed: Apr. 17, 2018

(86) PCT No.: PCT/JP2018/015862
§ 371 (c)(1),
(2) Date: Aug. 20, 2018

(87) PCT Pub. No.: WO2019/163150
PCT Pub. Date: Aug. 29, 2019

(65) Prior Publication Data
US 2021/0033792 A1 Feb. 4, 2021

(30) Foreign Application Priority Data
Feb. 21, 2018 (JP) .............................. JP2018-029156

(51) Int. Cl.
*G02B 6/255* (2006.01)
(52) U.S. Cl.
CPC ......... *G02B 6/2553* (2013.01); *G02B 6/2551* (2013.01)
(58) Field of Classification Search
CPC ........................... G02B 6/2551; G02B 6/2553
See application file for complete search history.

(56) References Cited

U.S. PATENT DOCUMENTS

| 4,343,983 A * | 8/1982 | Schneider .......... B23K 35/0205 |
| | | 219/145.21 |
| 6,462,298 B1 | 10/2002 | Ohmi et al. |
| 6,764,230 B1 | 7/2004 | Karacsony et al. |

(Continued)

FOREIGN PATENT DOCUMENTS

| CN | 102959444 A | 3/2013 |
| CN | 203178519 U | 9/2013 |

(Continued)

OTHER PUBLICATIONS

Office Action issued in corresponding Japanese Patent Application No. 2018-531680, dated Apr. 2, 2019 (3 pages).

*Primary Examiner* — Omar R Rojas
(74) *Attorney, Agent, or Firm* — Osha Bergman Watanabe & Burton LLP (57) ABSTRACT

An optical fiber fusion-splicer that fusion-splices at least a pair of optical fibers that includes: a pair of electrode rod units each having a pointed end portion that faces each other and a pair of mounting bases that each support the electrode rod units. Abutting portions of the optical fibers are interposed between the pair of electrode rod units. Each of the electrode rod units includes: an electrode rod that fusion-splices the optical fibers by discharge heating and a main heat dissipation member that protrudes from an outer circumferential surface of the electrode rod. Each of the pair of mounting bases supports a position of the electrode rod units that is closer to a base end side than a pointed end portion of the electrode rod.

7 Claims, 8 Drawing Sheets

(56) References Cited

U.S. PATENT DOCUMENTS

2005/0163447 A1    7/2005  Takahashi et al.
2013/0140290 A1*  6/2013  Kawasaki ............ G02B 6/2551
                                                            219/136

FOREIGN PATENT DOCUMENTS

| CN | 203965662 U | 11/2014 |
| CN | 205620579 U | 10/2016 |
| CN | 208569096 U | 3/2019 |
| EP | 2669724 A1 | 12/2013 |
| JP | H10-314978 A | 12/1998 |
| JP | 2005-234555 A | 9/2005 |
| JP | 2011-090041 A | 5/2011 |
| JP | 4867590 B2 | 2/2012 |
| JP | 5295438 B2 | 9/2013 |
| KR | 20130101054 A | 9/2013 |
| WO | 2012/101732 A1 | 8/2012 |

* cited by examiner

OPTICAL FIBER FUSION-SPLICER AND ELECTRODE ROD UNIT

CROSS REFERENCE TO RELATED APPLICATIONS

The present patent application is a national phase application of International Application No. PCT/JP2018/015862 filed on Apr. 17, 2018, which claims priority to Japanese Patent Application No. 2018-029156, filed Feb. 21, 2018. The contents of these applications are incorporated herein by reference in their entirety.

TECHNICAL FIELD

The present invention relates to an optical fiber fusion-splicer and an electrode rod unit.

BACKGROUND

In order to fusion-splice two optical fibers, an optical fiber fusion-splicer is used. An optical fiber fusion-splicer fuses and splices the end faces of optical fibers using the thermal energy of an arc discharge from two electrode rods (for example, see Patent Document 1).

Patent Documents

[Patent Document 1] Japanese Unexamined Patent Application, First Publication No. 2005-234555

In an optical fiber fusion-splicer, when electrical discharge is repeated, a pointed end of an electrode rod wears out and the electrode rod needs to be replaced. The wear can be delayed by increasing the diameter of the electrode rod; however this increases the costs of the electrode rod.

SUMMARY

One or more embodiments of the invention provide an optical fiber fusion-splicer and electrode rod unit in which the above-mentioned costs and wear on the electrode rods can be reduced.

An optical fiber fusion-splicer according to one or more embodiments that fusion-splices at least a pair of optical fibers includes a pair of electrode rod units of which pointed end portions are disposed to face each other with abutting portions of the optical fibers interposed therebetween, and a pair of mounting bases which respectively support the electrode rod units, in which each of the electrode rod units includes an electrode rod which fusion-splices the optical fibers by discharge heating, and a main heat dissipation member provided to protrude from an outer circumferential surface of the electrode rod, each of the mounting bases supports a position closer to a base end side than a pointed end portion of the electrode rod, and the main heat dissipation member is provided in contact with the outer circumferential surface of the electrode rod over a circumferential direction between the pointed end portion of the electrode rod and a support position of the electrode rod supported by the mounting base.

In one or more embodiments, the main heat dissipation member is formed of a metal.

In one or more embodiments, in the optical fiber fusion-splicer, irregularities are formed on a surface of the main heat dissipation member.

In one or more embodiments, in the optical fiber fusion-splicer, an auxiliary heat dissipation member is provided on the outer circumferential surface of the electrode rod, and the auxiliary heat dissipation member is provided in contact with the outer circumferential surface of the electrode rod over the circumferential direction on a side closer to a base end than the support position of the electrode rod supported by the mounting base.

The main heat dissipation member and the auxiliary heat dissipation member may be formed to be integrally connected with a connecting portion interposed therebetween.

An electrode rod unit according to one or more embodiments used for an optical fiber fusion-splicer includes a main heat dissipation member and an auxiliary heat dissipation member formed to be integrally connected with a connecting portion interposed therebetween.

Effects of the Invention

According to one or more embodiments, since the main heat dissipation member is provided, heat generated in the electrode rod can be transferred to the main heat dissipation member and an increase in temperature of the electrode rod can be reduced. Therefore, wear of the pointed end portion of the electrode rod can be reduced and a service life of the electrode rod can be prolonged. Further, according to one or more embodiments, since there is no cost increase factor such as an increase in diameter of the electrode rod, costs can be reduced.

DETAILED DESCRIPTION

Hereinafter, an optical fiber fusion-splicer and an electrode rod unit according to one or more embodiments will be described with reference to the drawings.

Figure 1:
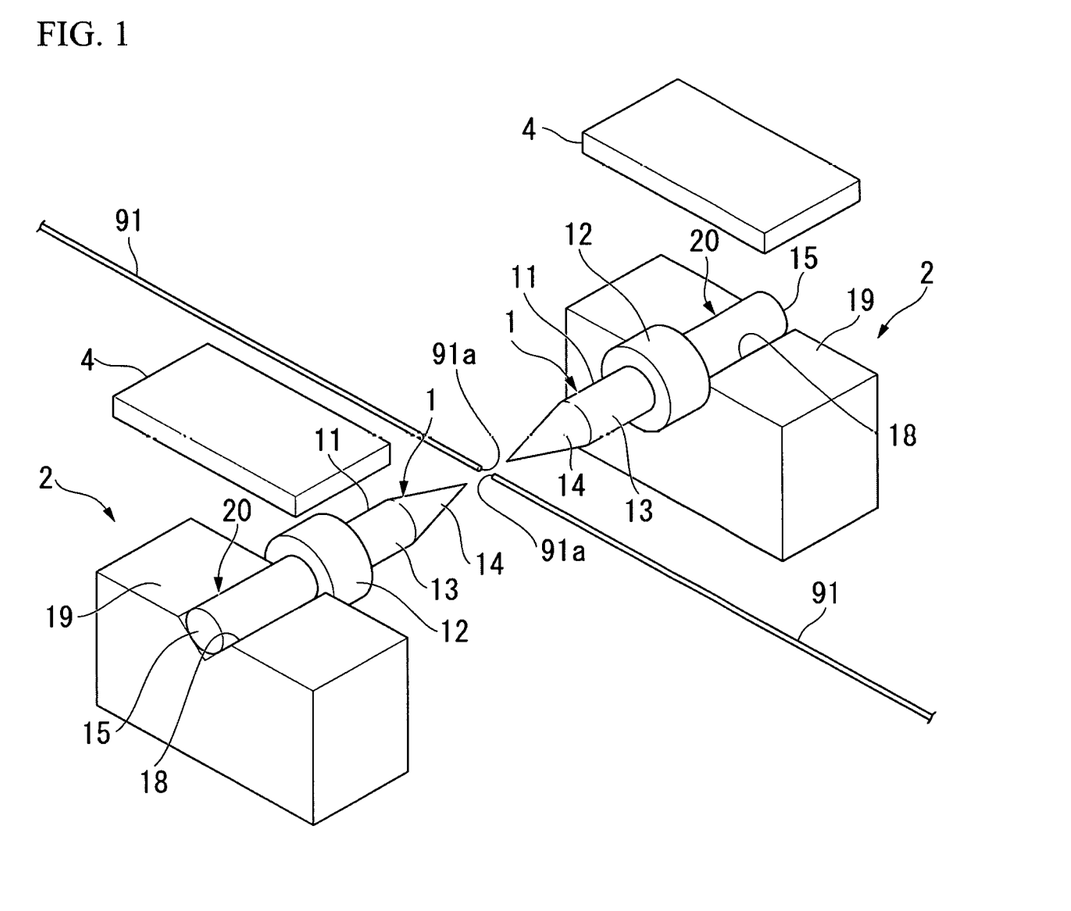
FIG. 1 is a configuration diagram showing a portion of an optical fiber fusion-splicer including an electrode rod unit according to one or more embodiments.
Figure 2:
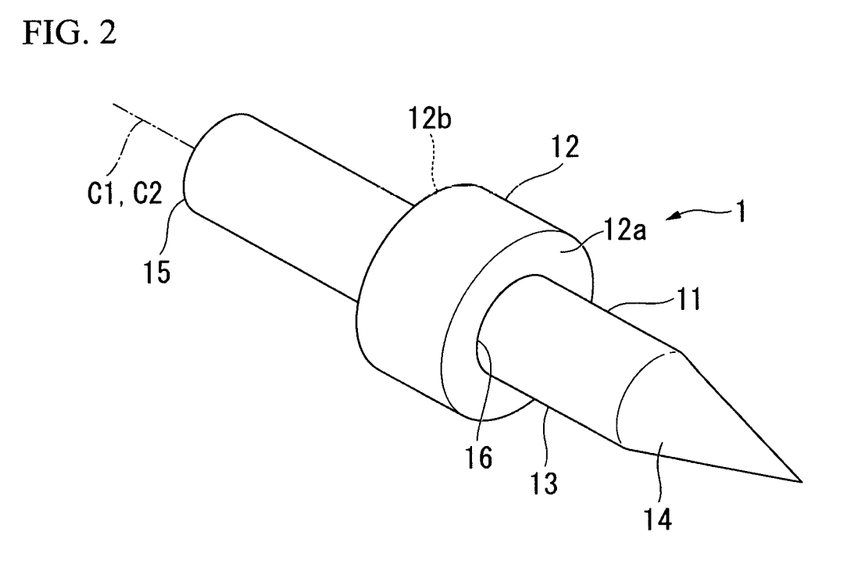
FIG. 2 is a perspective view showing the electrode rod unit shown in FIG. 1.
Figure 3:
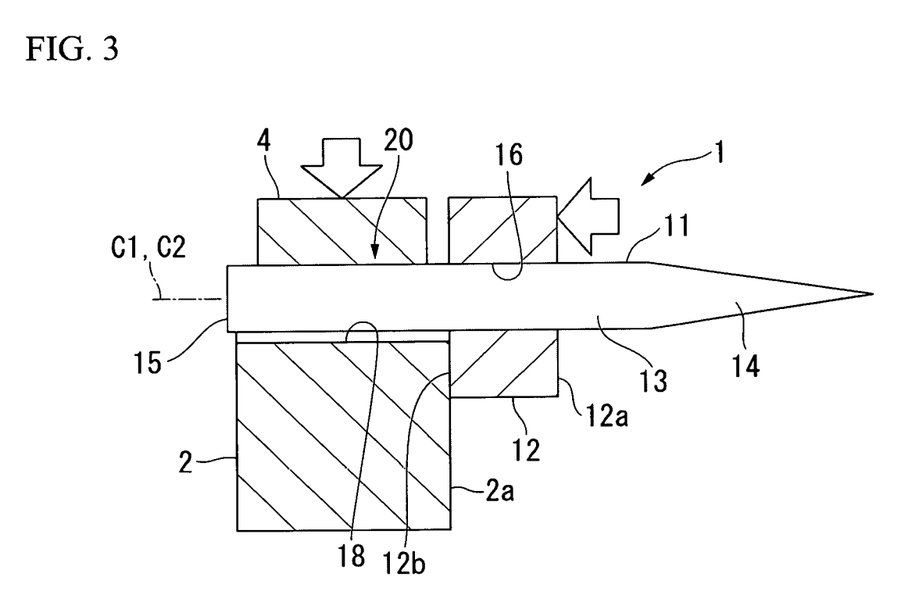
FIG. 3 is a cross-sectional view showing the electrode rod unit, a mounting base, and an electrode rod presser shown in FIG. 1.
Figure 4:
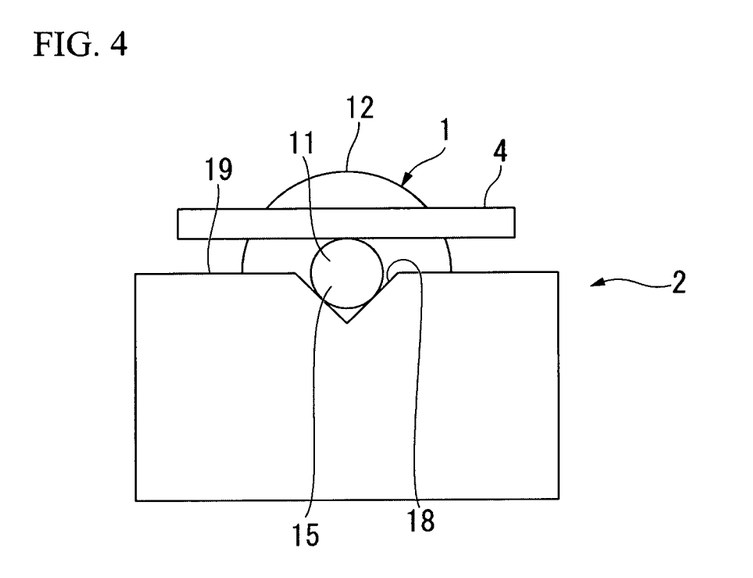
FIG. 4 is a rear view showing the electrode rod unit, the mounting base, and the electrode rod presser.
Figure 5:
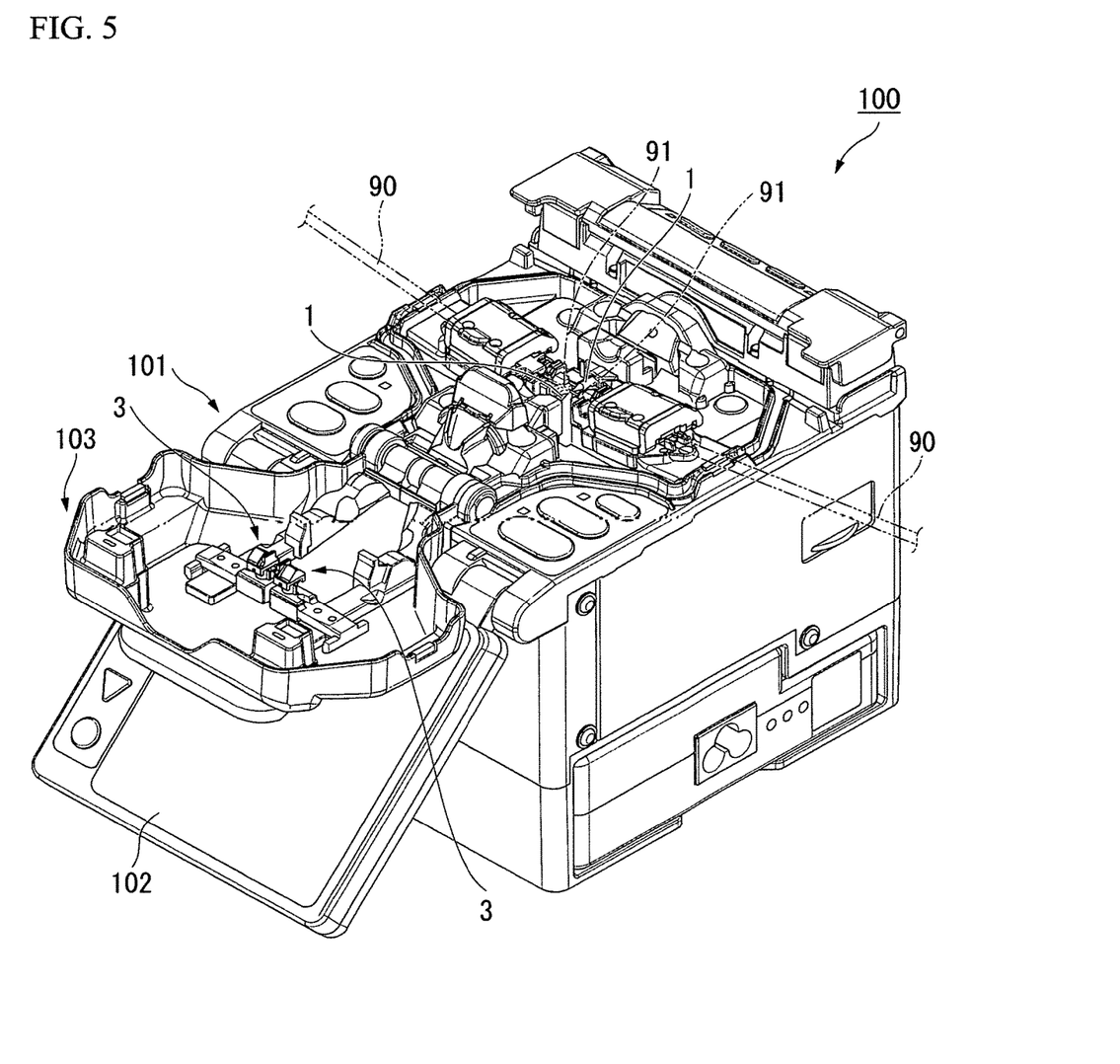
FIG. 5 is a configuration diagram showing the whole of the optical fiber fusion-splicer including the electrode rod unit shown in FIG. 1.

FIG. 1 is a configuration diagram showing a portion of an optical fiber fusion-splicer including an electrode rod unit 1 according to one or more embodiments. FIG. 2 is a perspective view showing the electrode rod unit 1. FIG. 3 is a cross-sectional view showing the electrode rod unit 1, a mounting base 2, and an electrode rod presser 4. FIG. 4 is a rear view showing the electrode rod unit 1, the mounting base 2, and the electrode rod presser 4. FIG. 5 is a configuration diagram showing the whole of an optical fiber fusion-splicer 100 including the electrode rod unit 1.

As shown in FIG. 5, the optical fiber fusion-splicer 100 includes a main body 101, a monitor 102, and a windproof cover 103. The monitor 102 displays images of ends of bare optical fibers 91 and 91. The windproof cover 103 reduces the influence of wind by covering the electrode rod unit 1, the mounting base 2 (see FIG. 1), a fiber clamp 3, and the like.

The main body 101 includes a pair of electrode rod units 1 and 1 (a first electrode rod unit and a second electrode rod unit), a pair of mounting bases 2 and 2 (a first mounting base and a second mounting base, see FIG. 1), a pair of fiber clamps 3 and 3, and a pair of electrode rod pressers 4 and 4 (see FIG. 1).

As shown in FIGS. 1 and 2, each of the electrode rod units 1 includes an electrode rod 11 and a main heat dissipation member 12 (a first heat dissipation member).

The electrode rod 11 is formed of a metal such as tungsten, for example. The electrode rod 11 includes a cylindrical body 13 and a conical pointed end portion 14. The pointed end portion 14 is formed to gradually taper in a direction away from the cylindrical body 13. An end portion of the electrode rod 11 on a side opposite to the pointed end portion 14 is referred to as a base end portion 15. A direction from the base end portion 15 toward the pointed end portion 14 is forwards and a direction opposite thereto is rearwards. As shown in FIG. 2, a reference sign C1 is a central axis of the electrode rod 11. A reference sign C2 is a central axis of the main heat dissipation member 12. 12a is a front surface of the main heat dissipation member 12.

As shown in FIG. 1, the electrode rod 11 (first electrode rod) of one electrode rod unit 1 (first electrode rod unit) and the electrode rod 11 (second electrode rod) of the other electrode rod unit 1 (second electrode rod unit) are disposed so that the pointed end portions 14 thereof face each other. The electrode rod 11 fusion-splices the bare optical fibers 91 and 91 by heating using an arc discharge.

The main heat dissipation member 12 is annular and has an insertion hole 16 through which the electrode rod 11 is inserted. An inner circumferential surface of the insertion hole 16 is in contact with an outer circumferential surface of the cylindrical body 13 over a circumferential direction. Specifically, the inner circumferential surface of the insertion hole 16 is in contact with the outer circumferential surface of the cylindrical body 13 over the whole circumference. In one or more embodiments, the entire inner circumferential surface of the insertion hole 16 is in contact with the outer circumferential surface of the cylindrical body 13. The main heat dissipation member 12 protrudes outward in a radial direction from the outer circumferential surface of the electrode rod 11. The main heat dissipation member 12 is attached and fixed to the cylindrical body 13, for example, by press-fitting or the like.

A constituent material of the main heat dissipation member 12 may be a metal such as aluminum, an aluminum alloy, a zinc alloy, tungsten, or the like. Zinc alloys include ZDC2 (in accordance with JIS H 5301: 2009), ZDC3, and the like. When the main heat dissipation member 12 is made of a metal, an amount of heat transferred from the electrode rod 11 can be increased, and thus an increase in temperature of the electrode rod 11 can be reduced.

When the constituent material of the main heat dissipation member 12 is a zinc alloy or an aluminum alloy, breakage of the main heat dissipation member 12 does not easily occur. The following conjecture is possible for the reason why breakage of the main heat dissipation member 12 does not easily occur. When a temperature of the electrode rod 11 (made of, for example, tungsten) reaches a high temperature, an outer diameter of the electrode rod 11 increases due to thermal expansion and an inner diameter of the main heat dissipation member 12 decreases. However, since the main heat dissipation member 12 has a relatively low rigidity and conforms to deformation of the electrode rod 11, breakage of the main heat dissipation member 12 at a portion in contact with the electrode rod 11 can be avoided.

A thermal conductivity of the main heat dissipation member 12 can be, for example, 80 W/(m·K) or more. As a method for measuring the thermal conductivity, for example, there is a method specified in JIS R 1611 and the like.

As shown in FIG. 3, the main heat dissipation member 12 is provided on a side in front of a support position 20 of the electrode rod 11 supported by the mounting base 2. That is, the main heat dissipation member 12 is provided between the pointed end portion 14 of the electrode rod 11 and the support position 20. In the electrode rod unit 1, a rear surface 12b of the main heat dissipation member 12 is in contact with a front surface 2a of the mounting base 2, and thereby rearward movement of the electrode rod unit 1 is restricted.

The main heat dissipation member 12 may be fixed to the cylindrical body 13 with an adhesive. Examples of the adhesive which can be used include a heat-resistant inorganic adhesive (for example, Aron Ceramic or the like manufactured by Toagosei Co., Ltd.), a heat-resistant epoxy adhesive (for example, Aremco-Bond 570, Aremco Bond 526-N, or the like manufactured by Audec Corporation), a heat-resistant liquid gasket silicone-based adhesive (for example, TB1209H, or the like), an anaerobic high-strength adhesive, and the like.

As shown in FIGS. 1 and 4, the mounting base 2 includes a mounting surface 19 having a holding groove 18. The holding groove 18 has, for example, a V-shaped cross section. The holding groove 18 allows the cylindrical body 13 of the electrode rod 11 to be fitted thereto and thus can position the electrode rod 11. The mounting base 2 supports a position on a rear side (base end side) of the pointed end portion 14 in the electrode rod 11. An inner surface of the holding groove 18 is made of, for example, a metal and may be capable of supplying power to the electrode rod unit 1.

The fiber clamps 3 and 3 in FIG. 5 grip and position the bare optical fibers 91 and 91 of a pair of optical fibers 90 and 90 when the windproof cover 103 is closed.

As shown in FIGS. 1, 3 and 4, the electrode rod presser 4 is formed, for example, in a rectangular plate shape. The electrode rod presser 4 is formed of a metal such as aluminum, for example. The electrode rod presser 4 can position the electrode rod 11 on the mounting base 2 by pressing the electrode rod 11. The electrode rod presser 4 can be fixed to the mounting base 2 using a fixing tool which is not shown in drawings. The electrode rod presser 4 can supply power to the electrode rod unit 1.

As shown in FIG. 1, in the electrode rod units 1 and 1, the pointed end portions 14 and 14 are disposed to face each other with the abutting portions of ends 91a and 91a of the bare optical fibers 91 and 91 interposed therebetween. In the optical fiber fusion-splicer 100, power is supplied to the electrode rod units 1 and 1 so that the ends 91*a* and 91*a* of the bare optical fibers 91 and 91 are fusion-spliced by discharge heating.

Since the electrode rod unit 1 has the main heat dissipation member 12, heat generated by the electrode rod 11 can be transferred to the main heat dissipation member 12 and released to the atmosphere. Therefore, an increase in temperature of the electrode rod 11 can be reduced. Therefore, wear of the pointed end portion 14 of the electrode rod 11 can be reduced and a service life of the electrode rod 11 can be prolonged. Since the electrode rod unit 1 has no cost increase factor such as an increase in diameter of the electrode rod 11, costs can be reduced.

Since the main heat dissipation member 12 is in contact with the outer circumferential surface of the electrode rod 11 over the whole circumference, a deviation in temperature in the circumferential direction of the electrode rod 11 does not easily occur. Therefore, wrapping deformation of the electrode rod 11 can be reduced. Therefore, a decrease in accuracy of the fusion splicing caused by positional deviation of the pointed ends of the electrode rods 11 can be prevented.

In the electrode rod unit 1, since the main heat dissipation member 12 is in contact with the front surface 2*a* of the mounting base 2 to restrict rearward movement, a configuration for positioning the electrode rod unit 1 in a front-rear direction is unnecessary. Therefore, a device configuration is simplified and costs can be reduced.

Figure 6:
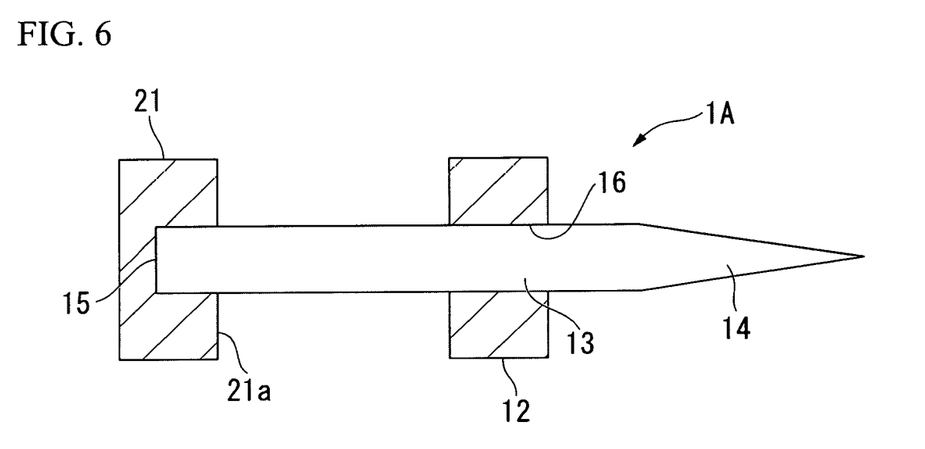
FIG. 6 is a cross-sectional view showing an electrode rod unit according to one or more embodiments.
Figure 7:
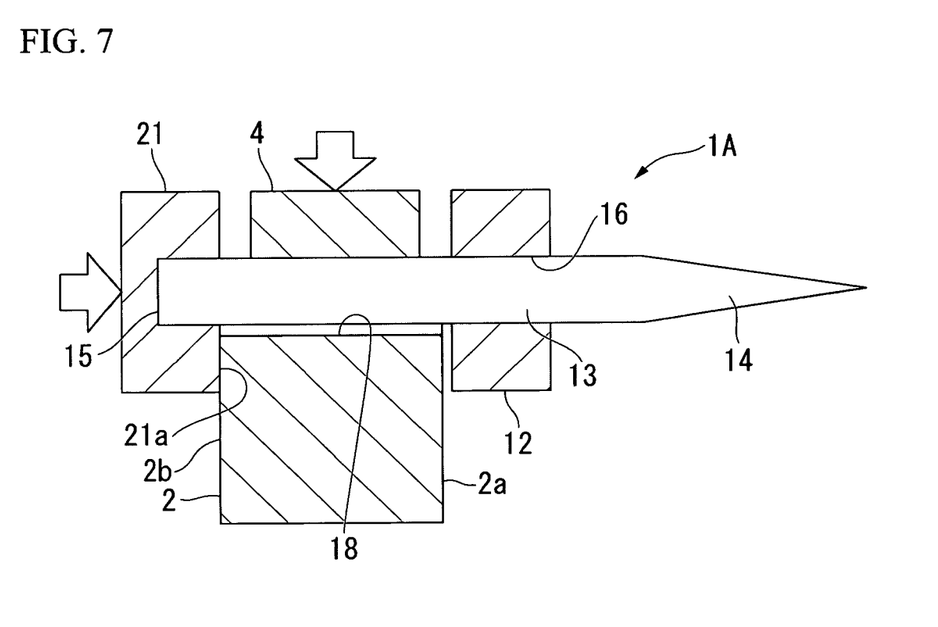
FIG. 7 is a cross-sectional view showing the electrode rod unit, a mounting base, and an electrode rod presser shown in FIG. 6.

FIG. 6 is a cross-sectional view showing an electrode rod unit 1A according to one or more embodiments. FIG. 7 is a cross-sectional view showing the electrode rod unit 1A, a mounting base 2, and an electrode rod presser 4. Further, components the same as in the other embodiments are denoted by the same reference signs, and descriptions thereof will be omitted.

As shown in FIGS. 6 and 7, according to one or more embodiments, the electrode rod unit 1A is different from the electrode rod unit 1 shown in FIG. 2 in that a positioning member 21 is provided at a portion including a base end portion 15 of an electrode rod 11. The positioning member 21 is formed in a cylindrical shape (or disc shape) having an outer diameter larger than that of the electrode rod 11. The positioning member 21 is formed of a resin or the like.

Forward movement of the electrode rod unit 1A is restricted due to a front surface 21*a* of the positioning member 21 being in contact with a rear surface 2*b* of the mounting base 2.

In one or more embodiments, the electrode rod unit 1A can prevent an increase in temperature of the electrode rod 11.

Therefore, wear of a pointed end portion 14 of the electrode rod 11 can be reduced and a service life of the electrode rod 11 can be prolonged. Further, since there is no cost increase factor such as an increase in diameter of the electrode rod 11, cost can be reduced.

In the electrode rod unit 1A, since a main heat dissipation member 12 is in contact with an outer circumferential surface of the electrode rod 11 over the whole circumference, a deviation in temperature in a circumferential direction of the electrode rod 11 does not easily occur, and thus wrapping deformation of the electrode rod 11 can be reduced. Therefore, a decrease in accuracy of the fusion splicing caused by positional deviation of pointed ends of the electrode rods 11 can be prevented.

Since positioning of the electrode rod unit 1A in a front-rear direction is possible due to the positioning member 21, a device configuration is simplified and costs can be reduced.

Figure 8:
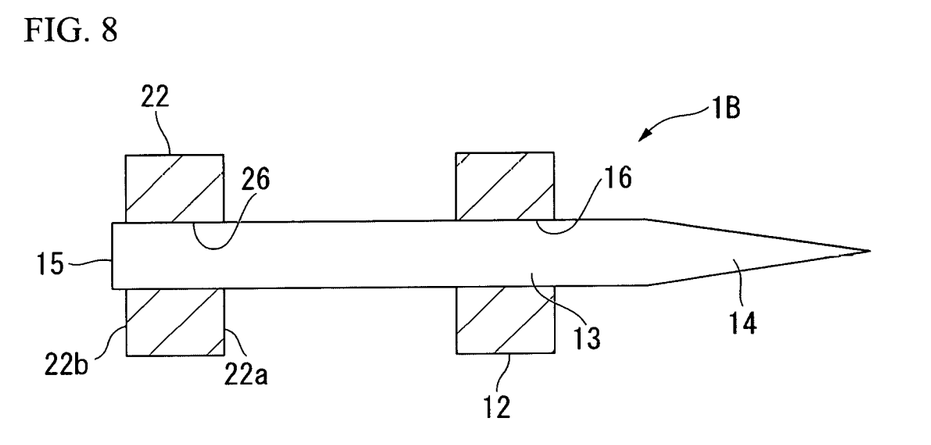
FIG. 8 is a cross-sectional view showing an electrode rod unit according to one or more embodiments.
Figure 9:
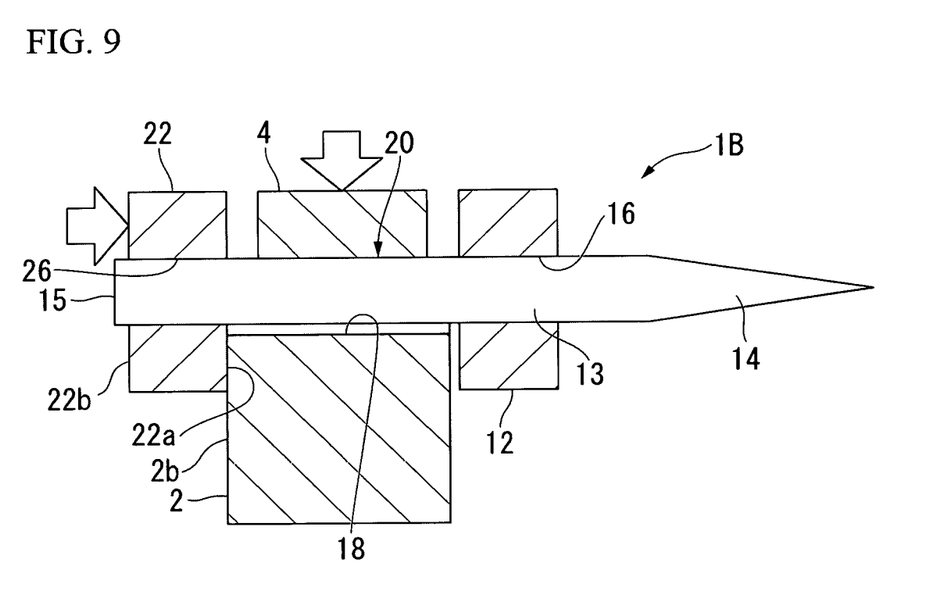
FIG. 9 is a cross-sectional view showing the electrode rod unit, a mounting base, and an electrode rod presser shown in FIG. 8.

FIG. 8 is a cross-sectional view showing an electrode rod unit 1B according to one or more embodiments. FIG. 9 is a cross-sectional view showing the electrode rod unit 1B, a mounting base 2, and an electrode rod presser 4. Further, components the same as in the other embodiments are denoted by the same reference signs, and descriptions thereof will be omitted.

As shown in FIGS. 8 and 9, according to one or more embodiments, the electrode rod unit 1B is different from the electrode rod unit 1 shown in FIG. 2 in that an auxiliary heat dissipation member 22 (second heat dissipation member) is provided at a position close to a base end portion 15 of the electrode rod 11. The auxiliary heat dissipation member 22 is formed in an annular shape having an outer diameter larger than that of the electrode rod 11.

The auxiliary heat dissipation member 22 is, for example, annular, and is provided on an outer circumferential surface of a cylindrical body 13 of the electrode rod 11. The auxiliary heat dissipation member 22 protrudes outward in a radial direction from the outer circumferential surface of the cylindrical body 13. A front surface 22*a* and a rear surface 22*b* of the auxiliary heat dissipation member 22 are, for example, perpendicular to a central axis of the auxiliary heat dissipation member 22. The auxiliary heat dissipation member 22 is a separate body from the electrode rod 11. The auxiliary heat dissipation member 22 has an outer diameter larger than that of the electrode rod 11.

The auxiliary heat dissipation member 22 has an insertion hole 26 through which the electrode rod 11 is inserted. An inner circumferential surface of the insertion hole 26 is in contact with an outer circumferential surface of the cylindrical body 13 over a circumferential direction (specifically, over the whole circumference). In one or more embodiments, the entire inner circumferential surface of the insertion hole 26 is in contact with the outer circumferential surface of the cylindrical body 13. The auxiliary heat dissipation member 22 is attached and fixed to the cylindrical body 13, for example, by press-fitting or the like. Material and physical property values of the auxiliary heat dissipation member 22 may be the same as those of a main heat dissipation member 12.

The auxiliary heat dissipation member 22 is provided closer to a rear side (base end side) than a support position 20.

Forward movement of the electrode rod unit 1B is restricted due to the front surface 22*a* of the auxiliary heat dissipation member 22 being in contact with a rear surface 2*b* of the mounting base 2.

In one or more embodiments, the electrode rod unit 1B can prevent an increase in temperature of the electrode rod 11. Therefore, wear of a pointed end portion 14 of the electrode rod 11 can be reduced and a service life of the electrode rod 11 can be prolonged. Further, since there is no cost increase factor such as an increase in diameter of the electrode rod 11, cost can be reduced.

In the electrode rod unit 1B, since the main heat dissipation member 12 and the auxiliary heat dissipation member 22 are in contact with an outer circumferential surface of the electrode rod 11 over the whole circumference, a deviation in temperature in a circumferential direction of the electrode rod 11 does not easily occur, and thus wrapping deformation of the electrode rod 11 can be reduced. Therefore, a decrease in accuracy of the fusion splicing caused by positional deviation of pointed ends of the electrode rods 11 can be prevented.

Since positioning of the electrode rod unit 1B in a front-rear direction is possible due to the auxiliary heat dissipation member 22, a device configuration is simplified and costs can be reduced.

Figure 10:
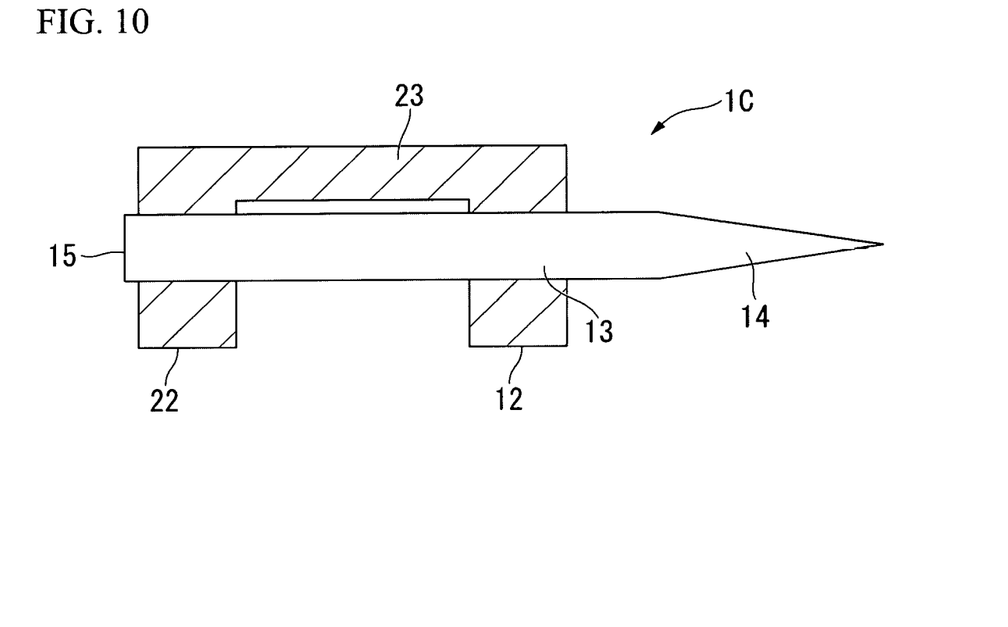
FIG. 10 is a cross-sectional view showing an electrode rod unit according to one or more embodiments.
Figure 11:
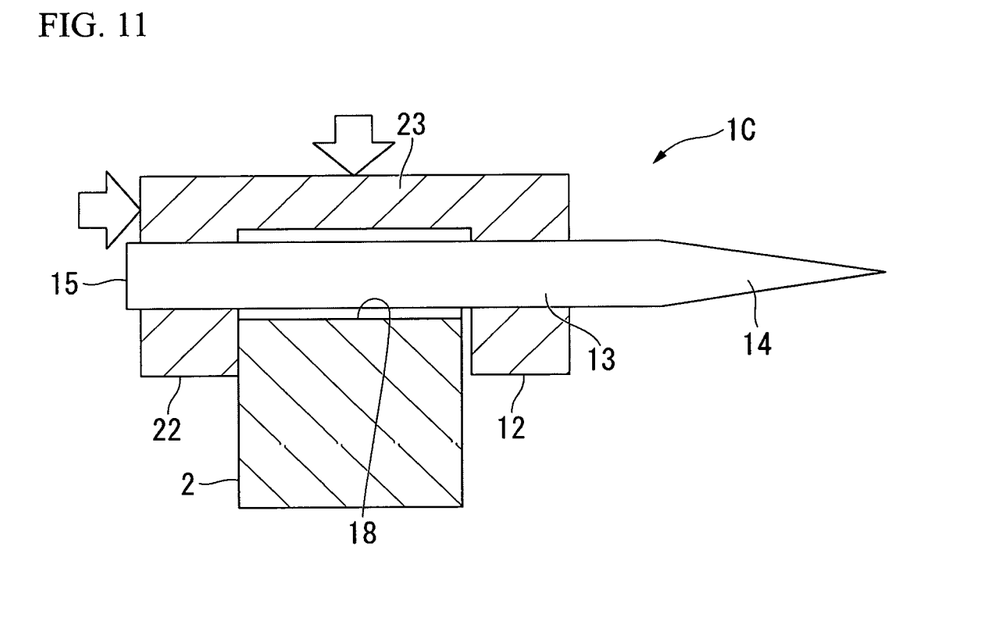
FIG. 11 is a cross-sectional view showing the electrode rod unit, a mounting base, and an electrode rod presser shown in FIG. 10.

FIG. 10 is a cross-sectional view showing an electrode rod unit 1C according to one or more embodiments. FIG. 11 is a cross-sectional view showing the electrode rod unit 1C, a mounting base 2, and an electrode rod presser 4. Further, components the same as in the other embodiments are denoted by the same reference signs, and descriptions thereof will be omitted.

As shown in FIGS. 10 and 11, according to one or more embodiments, the electrode rod unit 1C is different from the electrode rod unit 1B in that a main heat dissipation member 12 and an auxiliary heat dissipation member 22 are formed to be integrally connected with a connecting portion 23 interposed therebetween.

In one or more embodiments, the electrode rod unit 1C can prevent an increase in temperature of an electrode rod 11. Therefore, wear of a pointed end portion 14 of the electrode rod 11 can be reduced and a service life of the electrode rod 11 can be prolonged. Further, since there is no cost increase factor such as an increase in diameter of the electrode rod 11, costs can be reduced.

In the electrode rod unit 1C, since the main heat dissipation member 12 and the auxiliary heat dissipation member 22 are in contact with an outer circumferential surface of the electrode rod 11 over the whole circumference, a deviation in temperature in a circumferential direction of the electrode rod 11 does not easily occur, and thus wrapping deformation of the electrode rod 11 can be reduced. Therefore, a decrease in accuracy of the fusion splicing caused by positional deviation of pointed ends of the electrode rods 11 can be prevented.

Since positioning of the electrode rod unit 1C in a front-rear direction is possible due to the auxiliary heat dissipation member 22, a device configuration is simplified and costs can be reduced.

In the electrode rod unit 1C, a temperature of the main heat dissipation member 12 closer to the pointed end portion 14 tends to be higher than that of the auxiliary heat dissipation member 22. However, since an amount of heat transferred from the main heat dissipation member 12 to the auxiliary heat dissipation member 22 can be increased by the connecting portion 23, an increase in temperature of the electrode rod 11 can be reduced by preventing an increase in temperature of the main heat dissipation member 12.

Figure 12:
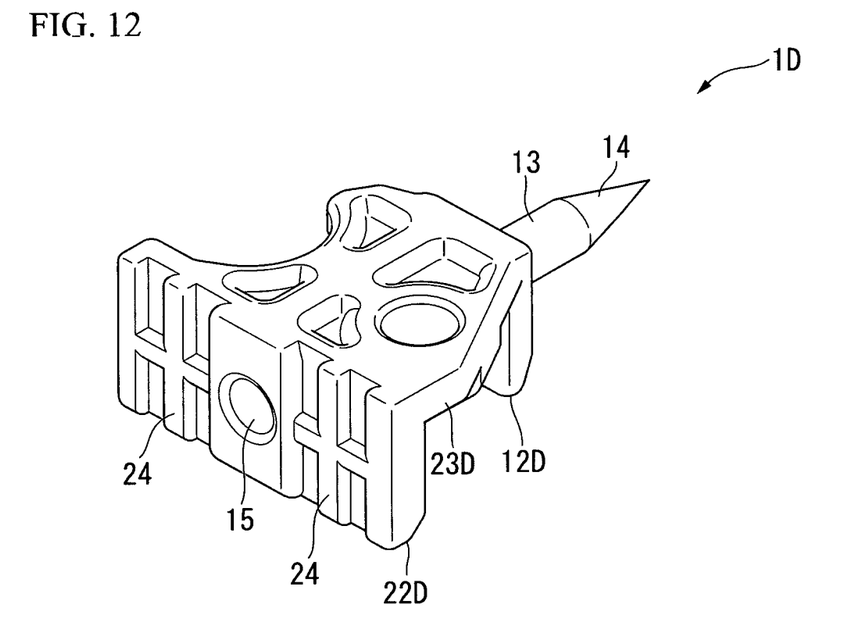
FIG. 12 is a perspective view showing a specific example of an electrode rod unit shown in FIG. 10.
Figure 13:
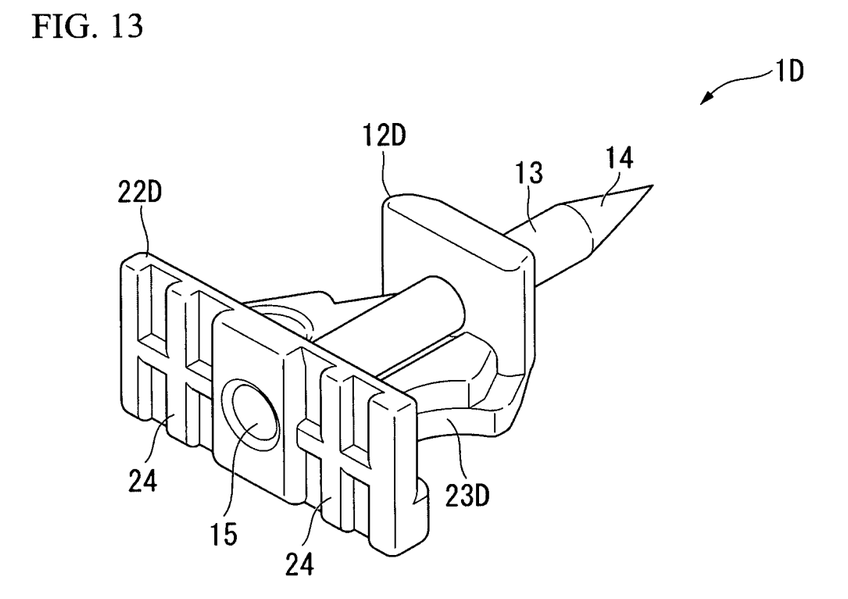
FIG. 13 is a perspective view showing the electrode rod unit shown in FIG. 12.

FIG. 12 is a perspective view showing an electrode rod unit 1D which is a specific example of the electrode rod unit 1C according to one or more embodiments. FIG. 13 is a perspective view showing the electrode rod unit 1D viewed from a side opposite to FIG. 12. Further, components the same as in the other embodiments are denoted by the same reference signs, and descriptions thereof will be omitted.

In the electrode rod unit 1D, a main heat dissipation member 12D and an auxiliary heat dissipation member 22D are formed to be integrally connected with a connecting portion 23D interposed therebetween. The main heat dissipation member 12D and the auxiliary heat dissipation member 22D are formed in a rectangular plate shape. The connecting portion 23D is formed in a plate shape.

In the electrode rod unit 1D, an irregular portion 24 is formed on surfaces of the main heat dissipation member 12D, the auxiliary heat dissipation member 22D, and the connecting portion 23D. The irregular portion 24 is irregularities formed by a plurality of protruding ridges formed on the surfaces of the main heat dissipation member 12D, the auxiliary heat dissipation member 22D, and the connecting portion 23D. Adjacent protruding ridges are formed at intervals in a width direction. Some of the plurality of protruding ridges may be formed in a direction perpendicular to the other protruding ridges. In the electrode rod unit 1D, since a surface area of the main heat dissipation member 12D, the auxiliary heat dissipation member 22D, and the connecting portion 23D is increased due to the irregular portion 24, heat dissipation characteristics can be enhanced.

While the invention has been described on the basis of one or more embodiments, the invention is not limited to the embodiments described above, and various modifications can be made without departing from the gist of the disclosure. For example, in the above-described embodiments, although the main heat dissipation member is provided in contact with the outer circumferential surface of the electrode rod over the whole circumference, the main heat dissipation member may not be in contact with the whole circumference of the outer circumferential surface of the electrode rod as long as the main heat dissipation member is in contact with the outer circumferential surface of the electrode rod over the circumferential direction. For example, the main heat dissipation member may be semi-annular and may be in contact with a half circumference of the outer circumferential surface of the electrode rod.

DESCRIPTION OF REFERENCE NUMERALS 1, 1A, 1B, 1C, 1D Electrode rod unit 1
2 Mounting base
11 Electrode rod
12, 12D Main heat dissipation member
14 Pointed end portion
20 Support position
22, 22D Auxiliary heat dissipation member
23, 23D Connecting portion
24 Irregular portion (irregularities)
100 Optical fiber fusion-splicer Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An optical fiber fusion-splicer that fusion-splices at least a pair of optical fibers, comprising:
    a pair of electrode rod units each having a pointed end portion that faces each other, wherein abutting portions of the optical fibers are interposed between the pair of electrode rod units; and
    a pair of mounting bases that respectively support the pair of electrode rod units, wherein
    each of the electrode rod units includes:
        an electrode rod that fusion-splices the optical fibers by discharge heating; and
        a main heat dissipation member that protrudes from an outer circumferential surface of the electrode rod,
    each of the pair of mounting bases supports a position of the respective electrode rod unit that is closer to a base end side than the pointed end portion of the electrode rod unit, the main heat dissipation member contacts the outer circumferential surface of the electrode rod over a circumferential direction between the pointed end portion of the electrode rod and a support position of the electrode rod supported by the mounting base, and a rear surface of the main heat dissipation member is in contact with a front surface of the mounting base.

2. The optical fiber fusion-splicer according to claim 1, wherein the main heat dissipation member is a metal.

3. The optical fiber fusion-splicer according to claim 1, wherein a surface of the main heat dissipation member has irregularities.

4. The optical fiber fusion-splicer according to claim 1, wherein an auxiliary heat dissipation member is disposed on the outer circumferential surface of the electrode rod, and the auxiliary heat dissipation member contacts the outer circumferential surface of the electrode rod over the circumferential direction on a side of the electrode rod unit closer to the base end side than the support position of the electrode rod.

5. The optical fiber fusion-splicer according to claim 4, wherein the main heat dissipation member and the auxiliary heat dissipation member are integrally connected with a connecting portion interposed therebetween.

6. An electrode rod unit used for an optical fiber fusion-splicer that fusion-splices at least a pair of optical fibers, the electrode rod unit comprising:

an electrode rod that fusion-splices the optical fibers by discharge heating;

a main heat dissipation member and an auxiliary heat dissipation member integrally connected with a connecting portion interposed therebetween, wherein the main heat dissipation member protrudes from an outer circumferential surface of the electrode rod, the optical fiber fusion-splicer comprises:

the electrode rod unit and another electrode rod unit that together form a pair of electrode rod units each having a pointed end portion that faces each other, wherein abutting portions of the optical fibers are interposed between the pair of electrode rod units; and a pair of mounting bases that respectively support the pair of electrode rod units, each of the pair of mounting bases supports a position of the respective electrode rod unit that is closer to a base end side than the pointed end portion of the electrode rod unit, the main heat dissipation member contacts the outer circumferential surface of the electrode rod over a circumferential direction between the pointed end portion of the electrode rod and a support position of the electrode rod supported by the mounting base, the auxiliary heat dissipation member is disposed on the outer circumferential surface of the electrode rod, and the auxiliary heat dissipation member contacts the outer circumferential surface of the electrode rod over the circumferential direction on a side of the electrode rod closer to the base end side than the support position of the electrode rod.

7. An optical fiber fusion-splicer that fusion-splices at least a pair of optical fibers, comprising:

a pair of electrode rod units each having a pointed end portion that faces each other, wherein abutting portions of the optical fibers are interposed between the pair of electrode rod units; and a pair of mounting bases that respectively support the pair of electrode rod units, wherein each of the electrode rod units includes:

an electrode rod that fusion-splices the optical fibers by discharge heating; and a main heat dissipation member that protrudes from an outer circumferential surface of the electrode rod, each of the pair of mounting bases supports a position of the respective electrode rod unit that is closer to a base end side than the pointed end portion of the electrode rod unit, the main heat dissipation member contacts the outer circumferential surface of the electrode rod over a circumferential direction between the pointed end portion of the electrode rod and a support position of the electrode rod supported by the mounting base, an auxiliary heat dissipation member is disposed on the outer circumferential surface of the electrode rod, the auxiliary heat dissipation member contacts the outer circumferential surface of the electrode rod over the circumferential direction on a side of the electrode rod unit closer to the base end side than the support position of the electrode rod, and the main heat dissipation member and the auxiliary heat dissipation member are to be integrally connected with a connecting portion interposed therebetween.

* * * * *